May 10, 1966  W. L. NELSON ETAL  3,250,249
BIRD HOUSES
Filed May 22, 1964  2 Sheets-Sheet 1
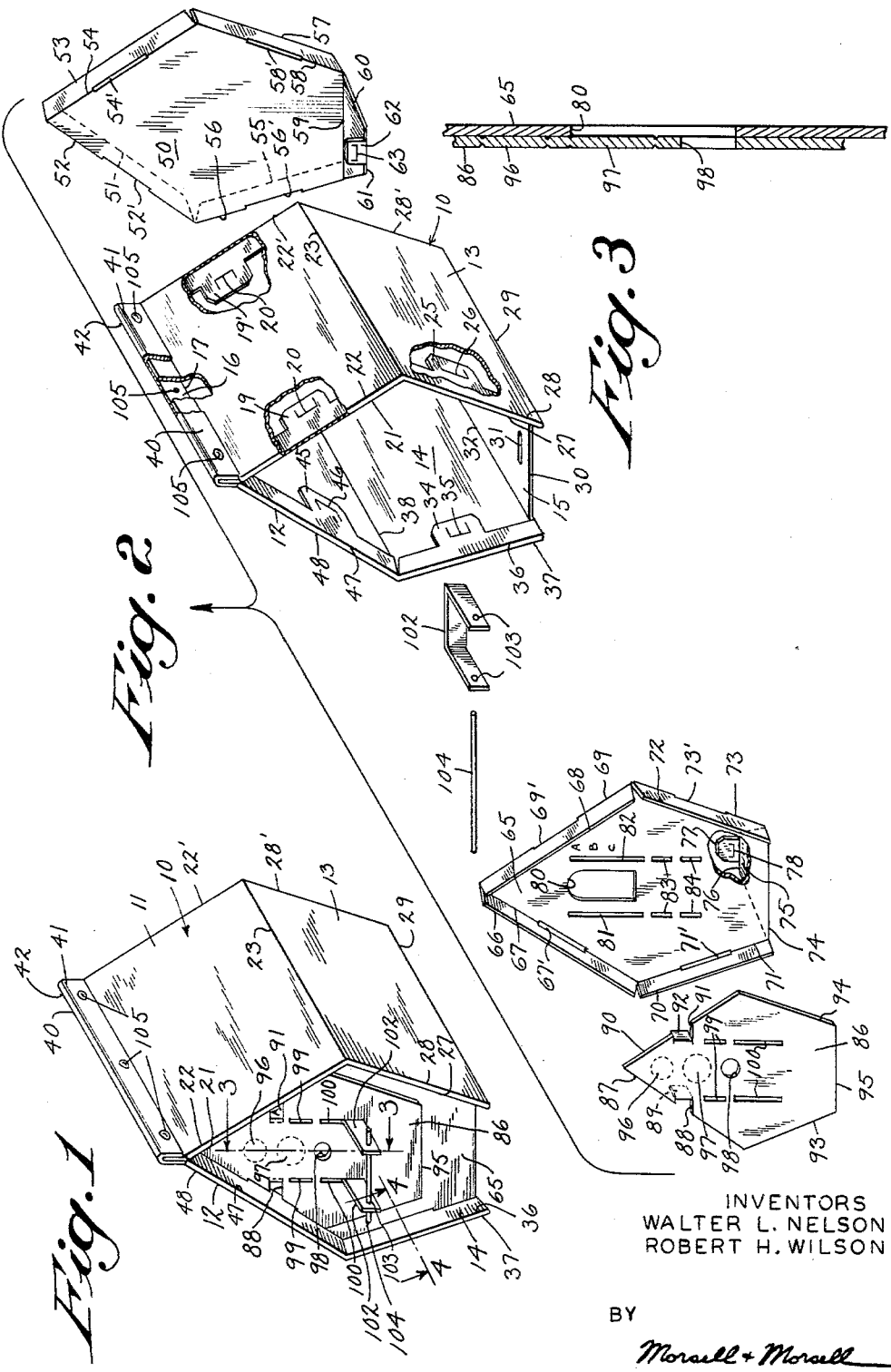
INVENTORS
WALTER L. NELSON
ROBERT H. WILSON
BY
Morsell + Morsell
ATTORNEYS May 10, 1966 W. L. NELSON ETAL 3,250,249
BIRD HOUSES
Filed May 22, 1964 2 Sheets-Sheet 2
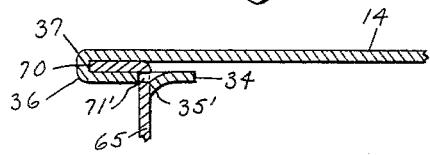
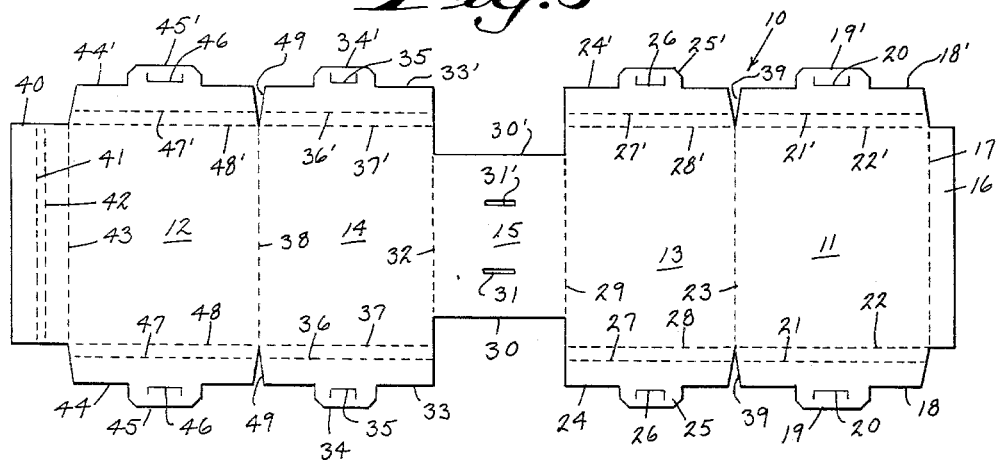
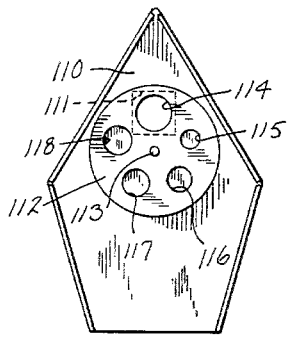
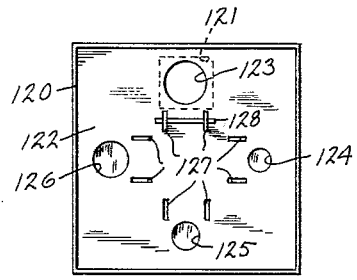
INVENTORS
WALTER L. NELSON
ROBERT H. WILSON
BY
*Morsell & Morsell*
ATTORNEYS

United States Patent Office 3,250,249
Patented May 10, 1966

---

3,250,249
BIRD HOUSES
Walter L. Nelson, Rte. 1, Box 56, Delafield, Wis., and Robert H. Wilson, 861 E. Roland Ave., Oconomowoc, Wis.
Filed May 22, 1964, Ser. No. 369,448
5 Claims. (Cl. 119—23)

This invention relates to improvements in bird houses, and more particularly to a collapsible bird house assembly adapted to be set up by the user.

One of the principal objects of the present invention is to provide a novel bird house formed of weatherproofed, corrugated paperboard or similar material, which structure can be conveniently and economically shipped or stored in a knocked-down, compact condition, and which can be quickly and easily assembled by the purchaser. The other principal object of the invention is to provide a bird house having selectable doorway opening and perch arrangements which permit the purchaser to select the specie of bird he desires as an occupant of the house.

Another important object of the invention is to provide a bird house constructed of paperboard or similar inexpensive material, as described, thus permitting the manufacture and sale of said structure at a substantially lower cost than conventional bird houses.

Still further objects of the present invention are to provide a bird house which is unique and attractive in appearance, which is relatively strong and durable, and which structure is otherwise particularly well adapted for its intended purpose.

With the above and other objects in view, which other objects and advantages will become apparent hereinafter, the invention comprises the novel and improved bird house illustrated and described in the following specification, and all equivalents or modifications thereof as may come within the spirit of said invention. In this respect, it is contemplated that numerous changes could be made in the design of the bird house hereinafter described while still incorporating its basic novelty, and it is to be clearly understood that the invention is not to be limited to the exact structure shown. Moreover, while it has been found that waterproofed corrugated paperboard is very satisfactory for use in the construction of the present bird house, numerous other materials, including plastics, could also be used and the invention is not to be limited or confined to any particular construction material.

In the accompanying drawings, wherein there is shown one preferred form of the invention and two modifications thereof, and wherein the same reference numerals designate the same or similar parts in all of the views:

FIG. 1 is a perspective view of the bird house comprising the present invention in its assembled condition;

FIG. 2 is an exploded perspective view of the bird house with portions of its surfaces broken away to disclose the structure thereunder;

FIG. 3 is a fragmentary vertical sectional view through the front wall and doorway panel assembly taken on line 3—3 of FIG. 1;

FIG. 4 is a fragmentary horizontal sectional view through interconnecting portions of the front and side walls;

FIG. 5 is a plan view of the blank from which the main portion of the house is formed;

FIG. 6 is a front elevational view of a modified form of the invention; and

FIG. 7 is a front elevational view showing another modification of the invention.

Referring now more particularly to the drawings, the novel bird house comprising the present invention includes a main unit or section 10 including a pair of roof panels 11 and 12, a pair of side walls 13 and 14, and a bottom 15. In the preferred form of the invention, said main house section 10 is designed to be formed from a one-piece blank which is die cut from corrugated cardboard which has had its outer surface waterproofed, as is well known in the art. Such material is not only durable and inexpensive, but the corrugated design thereof functions as insulation to promote the comfort and well-being of the feathered tenants. As mentioned, however, numerous other materials could also be employed, and the invention is by no means to be limited in this respect.

Said one-piece blank is illustrated in FIG. 5, and in said view the broken lines indicate creased fold lines formed in said blank. It will be seen that the first roof panel 11 in said blank has a protruding longitudinal edge portion 16 with a parallel fold line 17 spaced therefrom, and projecting from the side edges 18 and 18' of said panel are tabs 19 and 19' respectively, having U-shaped cuts 20 therein. Formed adjacent said side edges 18 and 18' are spaced, parallel fold lines 21 and 22, and 21' and 22' respectively, and said panel 11 is hingedly interconnected with a side wall panel 13 by longitudinal fold line 23, there being V-shaped cuts 39 between the marginal side portions of said adjacent panels.

Said side wall panel 13 includes side edges 24 and 24' with projecting tabs 25 and 25' having U-shaped cuts 26, and formed adjacent said side edges are pairs of spaced, parallel fold lines 27 and 28, and 27' and 28'. Said side wall panel is hingedly interconnected by fold line 29 to a bottom panel 14 which is substantially smaller than the adjacent panels in said blank, and formed therein in parallel relationship to the panel side edges 30 and 30' are cuts 31 and 31'. Said bottom panel is hingedly interconnected by the fold line 32 to a side wall panel 14.

The side wall panel 14 includes side edges 33 and 33' with projecting tabs 34 and 34' having U-shaped cuts 35, and formed in said panel adjacent the side edges thereof are pairs of spaced, parallel fold lines 36 and 37, and 36' and 37'. Said side wall panel is hingedly connected by fold line 38 to roof panel 12, there being V-shaped cuts 49 between the marginal side portions of said adjacent side wall and roof panels.

Said roof panel 12 has a protruding outer edge portion 40 with fold lines 41, 42 and 43 arranged in spaced parallel relationship thereto, and projecting from its side edges 44 and 44' are tabs 45 and 45' having U-shaped cuts 46 therein. Formed in said panel adjacent its side edges 44 and 44' are spaced, parallel fold lines 47 and 48, respectively.

In the merchandising of the novel, "do-it-yourself" bird house comprising the present invention, said main house section 10 will probably be supplied to the purchaser in a partially assembled but flattened condition. In this respect it is contemplated that the manufacturer will initially erect the several interconnected panels in said main section by folding the blank along the panel longitudinal fold lines, and the roof top flange 40 will be folded down over and secured to the flange 16 on the opposite roof panel 11, thus providing a completely interconnected pentagonal structure. Said hingedly connected main house section can then be flattened against itself for compact, economical storage or shipment, and it may be readily rearranged in its set-up condition by the purchaser. In the illustrated form of the inventioin, the aforementioned interfitting top flanges 40 and 16 are permanently joined by means of grommets 105 which also provide ready means for attaching wires or the like to the house for suspending the same from a tree or other support.

With reference now to FIG. 2 of the drawings, the back wall member 50 in the present structure is substantially pentagonal, with an elongated lower portion as shown, and is also adapted to be formed from a flat, scored blank. Said back wall is provided with downwardly diverging upper side edges 51 and 53 having adjacent fold lines 52 and 54, respectively, and upwardly diverging lower side edges 55 and 57 having adjacent fold lines 56 and 58. Formed in said fold lines 52, 54, 56 and 58, intermediate their lengths, are slotted openings 52', 54', 56' and 58', respectively. The bottom portion of said blank has a transverse fold line 59 formed therein to provide a deflectable base 60, and the latter is provided with a fold line 61 forming a tab 62 on its outer end, said tab having a U-shaped cut 63 therein.

The front wall 65 of the present structure is also substantially pentagonal in shape and is adapted to be formed by the purchaser from a flat blank of corrugated cardboard, or any other suitable material. As appears in FIG. 2, said front wall is provided with downwardly diverging upper side edges 66 and 68 having adjacent fold lines 67 and 69, respectively, and upwardly diverging lower side edges 70 and 72 having adjacent fold lines 71 and 73. Formed in said fold lines 67, 69, 71 and 73, intermediate their lengths, are slotted openings 67', 69', 71' and 73', respectively. The lower portion of said blank has a transverse fold line 74 forming a deflectable base portion 75, and the latter is provided with a fold line 76 forming a tab 77 on its outer end, said tab having a U-shaped cut 78 therein.

Formed in the upper central portion of the front wall 65 is an enlarged doorway opening 80, and spaced on each side of said doorway opening are elongated, parallel slots 81 and 82. In the preferred form of the invention, letters or other visible indicia, such as the illustrated letters A, B and C, are provided on the face of the front wall immediately adjacent at least one of said slots, the purpose of which will be hereinafter seen. Formed below and in alignment with said elongated vertical slots 81 and 82 are spaced pairs of shorter, parallel slots 83 and 84.

A separable, outer panel 86 is adapted to be mounted on the exterior face of the front wall 65 in the complete structure, said panel conforming generally to said wall member in shape but being substantially smaller, as illustrated. Said outer panel includes an upper side edge 87 having an edge cut-out 88 intermediate its length defining a rearwardly-projecting tab 89, and an opposite, diverging upper side edge 90 having an edge cut-out 91 defining a tab 92. The lower portion of said panel includes upwardly diverging side edges 93 and 94, and a bottom edge 95. Formed in the upper, central portion of said outer panel 86 is a first circular perforation 96, an intermediate circular perforation 97 aligned therebelow, and a lower circular perforation 98 (shown punched out). As will be hereinafter described in greater detail, said circular perforations are of various predetermined diameters to accurately correspond to the opening size requirements of various birds, and may be selectively punched out by the purchaser, depending upon his preference. Formed on either side of said circular perforations and extending therebelow is a first pair of parallel, vertical slots 99, and a second, elongated pair of slots 100 is aligned therebelow. When said outer panel 86 is mounted on the house front wall 65, said slotted openings are registrable with the wall slots 81–84 therebehind.

In addition to the foregoing structural elements, the complete bird house includes a U-shaped perch bracket 102 having aligned apertures 103 adjacent its outer ends, and a transverse perch bar 104. Said bracket may be formed of the same material as the house proper, and the perch 104 is preferably formed from a small stick. A somewhat rough or irregular stick is preferred to a smooth cylindrical rod or dowel in order to eliminate rotation of said perch in its bracket mounting, and to thereby facilitate the secure gripping of the same by a bird. Although it is not critical to the invention, the present bird house will ordinarily have a simulated shingle roof and mock windows thereon to provide an attractive structure which resembles a conventional home in appearance.

To assemble the novel bird house comprising the present invention, the purchaser first arranges the flattened main section 10 in its set up condition, as herein described. He then bends the marginal edge portions at the rearward end of said main section inwardly along fold lines 21' and 22', 27' and 28', 36' and 37', and 47' and 48', to provide inturned flanges which lie in a plane parallel to the plane of the adjacent panel, and he urges the U-shaped cuts in the edge tabs 19', 25', 34' and 45' outwardly to form protruding barbs. Due to the wedge-shaped cutouts between the marginal portions of the adjacent panels, as described, said flanges are adapted to fit together with their ends closely abutting, but without overlapping. The back wall member 50 is formed by bending its marginal edge portions rearwardly on fold lines 52, 56, 54 and 53, to provide right angular flanges, and the lower portion of said back wall is bent about the fold line 59 to provide a forwardly-extending base 60. The outer end of said base is then bent upwardly about the fold line 61 to form an upright tab 62, and the U-shaped cut 63 in said tab is urged outwardly to provide a protruding, deflectable barb.

With the back wall 50 arranged as described, it is inserted into the back opening of the main section 10, with the base element 60 of said back wall underlying the housing bottom 15, and said wall is initially pushed into said main section a sufficient distance to position it forwardly of the edges of the inturned flanges thereon. The assembler then reaches inwardly through the open forward end of said main section and urges said back wall rearwardly to a position firmly abutting the edges of said inturned flanges, the right angular flanges on said back wall being sandwiched between said main section walls and inturned flanges. Simultaneously the flange tabs 19', 25', 34' and 45' are forced through the aligned receiving slots 54', 58', 56' and 52' in said back wall member, and the upright tab 62 in the back wall base portion 60 is projected upwardly through the slotted opening 31' in the main section bottom 15. When the tabs have been projected through said slots, as described, the aforementioned barbs formed by the U-shaped cuts therein prevent the withdrawal of said tabs and function to lock said back member securely in place.

To assemble the front wall of the house, the marginal edge portions at the forward end of the main section 10 are bent inwardly along fold lines 21 and 22, 27 and 28, 36 and 37, and 47 and 48 to provide inturned flanges, and the U-shaped cuts in the tabs 19, 25, 34 and 45 are deflected to form protruding barbs. The marginal edge portions of the front wall member 65 are bent forwardly on fold lines 67, 71, 73 and 69, said deflected marginal portions forming flanges which extend forwardly at a right angle to the plane of said wall, as shown in FIG. 2. The lower portion of said front wall is then bent rearwardly about the fold line 74 to form a base 75, and an upright tab 77 is formed by deflecting the outer end of said base upwardly about the fold line 76, the U-shaped cut 78 in said tab being urged outwardly to provide a barb. Prior to the installation of said front wall, the perch bracket 102 is projected forwardly through one of the pairs of slotted openings 81–82, 83 or 84 in said front wall, the particular pair of slots selected being dependent upon the proper perch position for the specie of bird desired as a tenant, as will be hereinafter described in greater detail. Said perch bracket can have barbs or other suitable means associated therewith for maintaining the same in its straight, forwardly-projecting position, although this is not generally required.

The front wall 65 is then inserted into the forward end of the main section 10 with the base element 75 of said wall underlying the bottom 15, and is urged rearwardly beyond the edges of the inturned flanges on said main section. The assembler may then insert his fingers through the enlarged doorway opening 80 to obtain a firm grip, and said wall is pulled forwardly to a position firmly abutting the edges of said flanges, and with the right angular flanges on said front wall member sandwiched between the main section walls and the inturned flanges thereon. Simultaneously the flange tabs 19, 25, 34 and 45 are forced through the aligned slotted openings 69', 73', 71' and 67' in said front wall member, and the upright tab 77 on said front wall base portion 75 is projected upwardly through the slotted opening 31 in said main section bottom. As described, and as will be seen in FIG. 4, when said tabs have been projected through their receiving slots, the outwardly-deflected, U-shaped cuts therein form barbs (designated by the numeral 35') which prevent the withdrawl of said tabs and function to lock said wall member securely in place. The locked, interfitting wall flange design of the present structure is one of the important features of the invention since it not only provides a secure and reliable connection, but said marginal flanges greatly increase the strength of the cardboard or other material, and provide a strong, rigid and durable bird house.

In the completely assembled structure the outer panel 86 is mounted on the housing front wall 65, and one of the perforated, circular doorways 96, 97 or 98 is punched out to provide means of ingress and egress, as will be described. To attach said panel 86 to the front wall, the rearwardly deflected panel tabs 88 and 92 are inserted into and through the elongated vertical slots 81 and 82 in said wall member, and the forwardly-extending perch bracket 102 is guided through one of the pairs of slots 99 or 100 in said outer panel. Due to the elongated design of the slots through which said bracket member and the tabs 89 and 92 project, said panel 86 is vertically-slidably adjustable on said front wall. The perch 104 is then projected through the bracket end opening 103, and the assembly of the bird house is complete.

As hereinbefore mentioned, one of the principal features of the present invention is that it can be arranged to accommodate the particular type of bird preferred by the purchaser. In this respect, the several doorways 96–98 are formed or predetermined diameters which are accurately dimensioned for various sized birds, and purchasers are supplied with instruction data indicating, among other things, which of said doorways should be punched out for each type of bird.

In addition to the size of the doorway opening, the two other critical requirements in designing a house for particular bird species, are the position of the perch relative to the doorway opening, and the vertical distance from said doorway opening to the floor of the house, and the present invention has been designed to permit the arcuate setting of both to correspond to the requirements of the intended occupant. As mentioned, the perch 102 can be mounted in any of the vertically-spaced pairs of slots 81–82, 83 or 84, and numerals or other visual means are provided on the back face of the front wall member 65 to designate the proper perch-receiving slots for various birds. In addition, the outer face of said wall member 65 is preferably provided with letters A, B and C, or other indicators, which are positioned to be selectably visible in the cut-outs 88 or 91 in the outer panel 86 when said vertically-adjustable panel is positioned with the doorway opening therein spaced a predetermined distance from the bottom of the bird house. Thus both the position of the perch relative to the doorway, and the distance from said doorway to the floor of the house can be readily adjusted and set. Included in the purchaser's instruction data is a chart or table indicating the proper settings of said elements for most popular birds.

It is to be understood, of course, that more than three doorway openings can be provided if it is desired to obtain an even greater range of opening sizes. Moreover, neither the particular manner of lettering or marking the various settings, nor the type of instruction material supplied to the purchaser are critical to the present invention. What is novel is the concept of a bird house having selectable doorway opening and perch arrangements, and it is contemplated that numerous changes could be made in the illustrated form of the invention while still incorporating its basic principal.

In FIG. 6, for example, there is illustrated a bird house generally similar to that hereinbefore described, said structure including a front wall 110 having an enlarged doorway opening 111 therein. In this form of the invention a circular outer plate or disc member 112 is rotatably secured on said front wall, as at 113, and said disc is provided with a plurality of circumferentially-spaced doorway openings 114–118 of various diameters. When it has been determined what size opening is required for the intended occupant, said disc may be manually rotated to bring the corresponding doorway opening therein into registration with the enlarged wall opening 111 therebehind.

In FIG. 7 is a box-like structure providing another modified form of the invention, and in this construction the square front face of the house has a marginal flange or frame 120 designed to removably retain a similarly-shaped outer panel 122. Said outer panel has four doorway openings 123–126 spaced therearound, and when the purchaser determines what size opening is to be utilized, said outer panel 122 can be removed from the surrounding frame 120 and turned and remounted therein with said opening in registration with the enlarged opening 121 in the housing front wall. Said outer panel is preferably provided with individual perch brackets 127 beneath each of said selectable doorway openings.

In lieu of the single outer panels having a plurality of different sized doorway openings shown in the illustrated forms of the present invention, it is also possible to employ several interchangeable panels, each with a single, different sized opening, to obtain the same result. Moreover, the opening in each panel can be so positioned therein that it would be the desired predetermined distance from the bottom of the bird house. It is contemplated, too, that while the selectable doorway panels have been illustrated and described herein as being mounted on the outer face of the housing front wall, it is also possible to position the same immediately behind said front wall, and the invention is not to be limited in this respect.

From the foregoing detailed description it will be seen that the present invention provides a novel bird house structure which has several advantages over conventional bird houses. The present invention is not only designed to be formed of corrugated paperboard or other inexpensive material, but it is adapted to be economically shipped and stored in a flat, compact condition, thereby providing further cost savings. Moreover, the present structure is so designed that it can be quickly and easily adapted to accommodate any desired specie of bird, depending upon the purchaser's preference.

As mentioned, it is to be understood that while a preferred form of the invention and two modifications thereof have been shown and described herein, the invention is not to be limited or confined to the structures disclosed. What is intended to be covered herein are the illustrated structures and also any and all modifications thereof as may come within the spirit of said invention, and within the scope of the following claims.

What we claim is:

1. A bird house, comprising: a main section having a pair of roof panels, a pair of side wall panels, and a bottom; a back wall mounted in said main section; inturned flanges formed on said roof and side wall panels at their forward ends, said flanges lying in a plane parallel to the plane of the panels to which they are connected; a tab extension on each of said flanges, said tabs having punched out, deflectable barbs formed therein; a front wall in said house having forwardly-projecting flanges sandwiched between said main section panels and their flanges, said front wall having receiving slots through which said barbed tabs project to lock said front wall within said house main section; a doorway opening in said front wall; and a perch projecting outwardly from said front wall adjacent said doorway opening.

2. The bird house recited in claim 1 wherein said front wall is provided with an outer panel having a plurality of perforated circles of different diameters, said circles being adapted to be selectively punched out to provide a doorway opening of predetermined size.

3. The bird house recited in claim 1 wherein said perch is vertically adjustable to permit the positioning of the same in predetermined spaced relationship to said doorway opening.

4. The bird house recited in claim 1 wherein said front wall is provided with an outer panel having a plurality of perforated circles of different diameters, said circles being adapted to be selectively punched out to provide a doorway opening of predetermined size, and wherein said perch is adjustable to permit the positioning of the same in predetermined spaced relationship to said doorway opening.

5. A bird house, comprising: a main section having a pair of roof panels, a pair of side wall panels, and a bottom panel having a pair of spaced slots therein, said panels being hingedly interconnected and adapted to be formed from a single blank of material; an inturned flange formed on each of said roof and side wall panels at their forward and rearward ends, said flanges lying in a plane parallel to the plane of the panels to which they are connected; a tab extension on each of said flanges, said tabs having punched out, deflectable barbs therein; a back wall in said house having rearwardly-projecting flanges sandwiched between said main section panels and their connected rear flanges, said back wall having receiving slots through which said barbed tabs project to lock said back wall within said house main section, and said back wall having a forwardly-extending base with an upright, barbed tab thereon projected upwardly through one of said main section bottom slots; a front wall in said house having forwardly-projecting flanges sandwiched between said main section panels and their forward flanges, said front wall having receiving slots through which said barbed tabs project, said front wall having a base with an upright barbed tab thereon projected upwardly through the other main section bottom slot, said front wall having an enlarged doorway opening centered in its upper portion, having a pair of elongated vertical slots on opposite sides of said doorway, and said front wall having pairs of shorter parallel vertical slots aligned below said elongated slots; vertically-spaced settings indicia formed on said front wall adjacent one of said elongated vertical slots; an outer panel vertically-adjustably mounted on said front wall, said outer panel having cutouts in its side edges defining tabs which are projected through the elongated slots in said front wall to maintain said outer panel thereon, and said cutouts providing a view of said settings indicia, said outer panel having a plurality of perforated circles therein of different diameters which are adapted to be selectively punched out to provide a doorway opening of predetermined size, the vertically-movable mounting of said outer panel permitting said doorway opening to be positioned in registration with the enlarged doorway opening in the front wall and in predetermined spaced relationship to the bottom of said house, said outer panel having a pair of parallel vertical slots on opposite sides of said perforated circles, and having a pair of elongated vertical slots aligned therebelow, said slots registering with the vertical slots in the front wall of said house; a perch bracket having a pair of horizontal arms projecting through one of said registering sets of front wall and panel slots, the selected slots being dependent upon the desired position of said bracket relative to the panel doorway opening; and a perch carried by and between said spaced bracket arms.

References Cited by the Examiner

UNITED STATES PATENTS

| 388,385 | 8/1888 | Wooster. | |
| 1,166,100 | 12/1915 | White | 119—23 |
| 1,173,823 | 2/1916 | McDaniel | 119—19 |
| 2,666,414 | 1/1954 | Burr et al. | 119—23 |

OTHER REFERENCES

Popular Science: "Dial Bird House Suits Any Tenant," p. 67, July 1939.

SAMUEL KOREN, *Primary Examiner.*

HUGH R. CHAMBLEE, *Examiner.*